United States Patent [19]
Behlke et al.

[11] Patent Number: 6,107,930
[45] Date of Patent: *Aug. 22, 2000

[54] SECURITY SYSTEM KEYPAD ILLUMINATED BY PROXIMATE MOTION

[76] Inventors: George Eric Behlke; Kevin William Patterson, both of 130 Perinton Parkway, Fairport, N.Y. 14450

[*] Notice: This patent issued on a continued prosecution application filed under 37 CFR 1.53(d), and is subject to the twenty year patent term provisions of 35 U.S.C. 154(a)(2).

[21] Appl. No.: 08/958,592

[22] Filed: Oct. 29, 1997

[51] Int. Cl.[7] .................................................. G05B 23/02
[52] U.S. Cl. ................. 340/825.17; 340/525; 340/691.3; 340/573; 340/815.48
[58] Field of Search ........................ 340/825.17, 825.69, 340/825.72, 528, 541, 573, 825.31, 547; 341/22

[56] References Cited

U.S. PATENT DOCUMENTS

| | | |
|---|---|---|
| 5,319,350 | 6/1994 | DeMarco et al. .................. 340/435 |
| 5,695,091 | 12/1997 | Winnings et al. .................... 222/1 |
| 5,712,621 | 1/1998 | Andersen ............................ 340/547 |
| 5,721,542 | 2/1998 | Shpater .............................. 341/23 |
| 5,844,506 | 12/1998 | Binstead ............................ 341/34 |
| 5,881,377 | 3/1999 | Giel et al. ......................... 455/343 |
| 6,046,730 | 4/2000 | Bowen et al. ..................... 345/168 |

*Primary Examiner*—Michael Horabik
*Assistant Examiner*—Anthony A. Asongwed
*Attorney, Agent, or Firm*—J. Addison Mathews

[57] ABSTRACT

A security interface device, such as a keypad, includes a proximity detector sensing a human approach and operating a light source to enhance illumination of the device in response to such approach. A timing device switches the illumination source off after the expiration of a predetermined time period and the proximity detector switches said illumination source on, or enhances the illumination, in response to the detection of movement in the vicinity of the pad. The proximity detector has a short range, and the range preferably does not intercept the floor or ceiling, to reduce triggering by pets, fans, ceiling lights and other non-human sources.

19 Claims, 2 Drawing Sheets

SECURITY SYSTEM KEYPAD ILLUMINATED BY PROXIMATE MOTION

FIELD OF INVENTION

The invention relates to security systems, to interface devices, such as keypads, coupled to security systems, and to illumination controls including a proximity detector for automatically lighting the operating features of such interface devices.

BACKGROUND OF THE INVENTION

A typical security system includes event detectors, keypads and alarms linked to a control panel by wire or radio frequency signals. The event detectors might include contacts positioned at doors and windows, motion detectors covering the open space of halls and rooms and fire detectors secured to ceilings. The contacts change their normally open or closed state in response to an entry or exit, motion detectors sense the activity of intruders and fire detectors respond to heat, temperature changes or smoke. When such predetermined events are detected, signals are sent to the control panel and the panel activates a sounder, strobe or other appropriate alarm. The control panel may also send messages to a central monitoring facility.

The keypads provide for inputs to the system and display system status. Alpha-numeric keys permit data entry, while light emitting diodes (LEDs) and liquid crystal displays (LCDs) present system outputs. The system is controlled from the keypad by entering an appropriate identification number, permitting access to system control. Desired system status, such as "armed" or "disarmed," can then be entered. Similarly, system status can be confirmed at the keypad, including the alarm state of one or more zones in the protected area.

The keypads usually are located inside the protected area, in locations convenient for controlling the system throughout the day. Typical locations include entrance points and bedrooms. Operation is facilitated under otherwise dark conditions by self-illumination of the keypad. When building lights are extinguished at night, for example, the operating features are illuminated by internal light sources which typically are on all the time.

Although existing illumination approaches are satisfactory in many installations, constant illumination of the keypad is inconvenient under certain conditions. Bedroom installations, for example, call for reduced illumination, or none at all. Battery operated devices pose similar issues based on the limited energy supply. High security areas sometimes require a blacked out keypad. Touch activated illumination solves part of the problem, but the keypad still must be found in the dark before it is illuminated by touching.

SUMMARY OF THE INVENTION

The present invention is directed to overcoming one or more of the problems set forth above and to providing an improved security interface device with a proximity detector for activating or enhancing illumination of the interface device in response to a human approach.

Briefly summarized, according to one aspect of the invention, a security interface device includes a proximity detector sensing any human approach and operating a light source to enhance illumination of the device in response to such approach. According to more specific features, the proximity detector responds to an approach within a predetermined distance, such as seven, five or three feet, by illuminating the interface device.

According to other features of the invention, the interface device is a communication pad. A timing device switches the illumination source off, or reduces the illumination, after the expiration of a predetermined time period. The proximity detector switches the illumination source on, or increases the illumination, in response to detection of movement in the vicinity of the pad.

Still other features of the invention relate to a security system including a control panel, a plurality of event detectors coupled to the panel, a keypad including input elements for controlling the system and display elements indicating the status of the system. The keypad further includes a passive motion sensor and an illumination source operative to enhance illumination of the input and said display elements. The motion sensor operates the illumination source, in response to movement detected within a predetermined distance from the keypad, to enhance the illumination of the input and display elements.

In accordance with the invention, illumination of a security interface device can be reduced or eliminated until required by an approaching operator, enhancing bedroom operation, improving security and reducing unnecessary current draw of battery operated devices.

These and other features and advantages of the invention will be more clearly understood and appreciated from a review of the following detailed description of the preferred embodiments and appended claims, and by reference to the accompanying drawings.

DETAILED DESCRIPTION OF THE INVENTION

Figure 1:
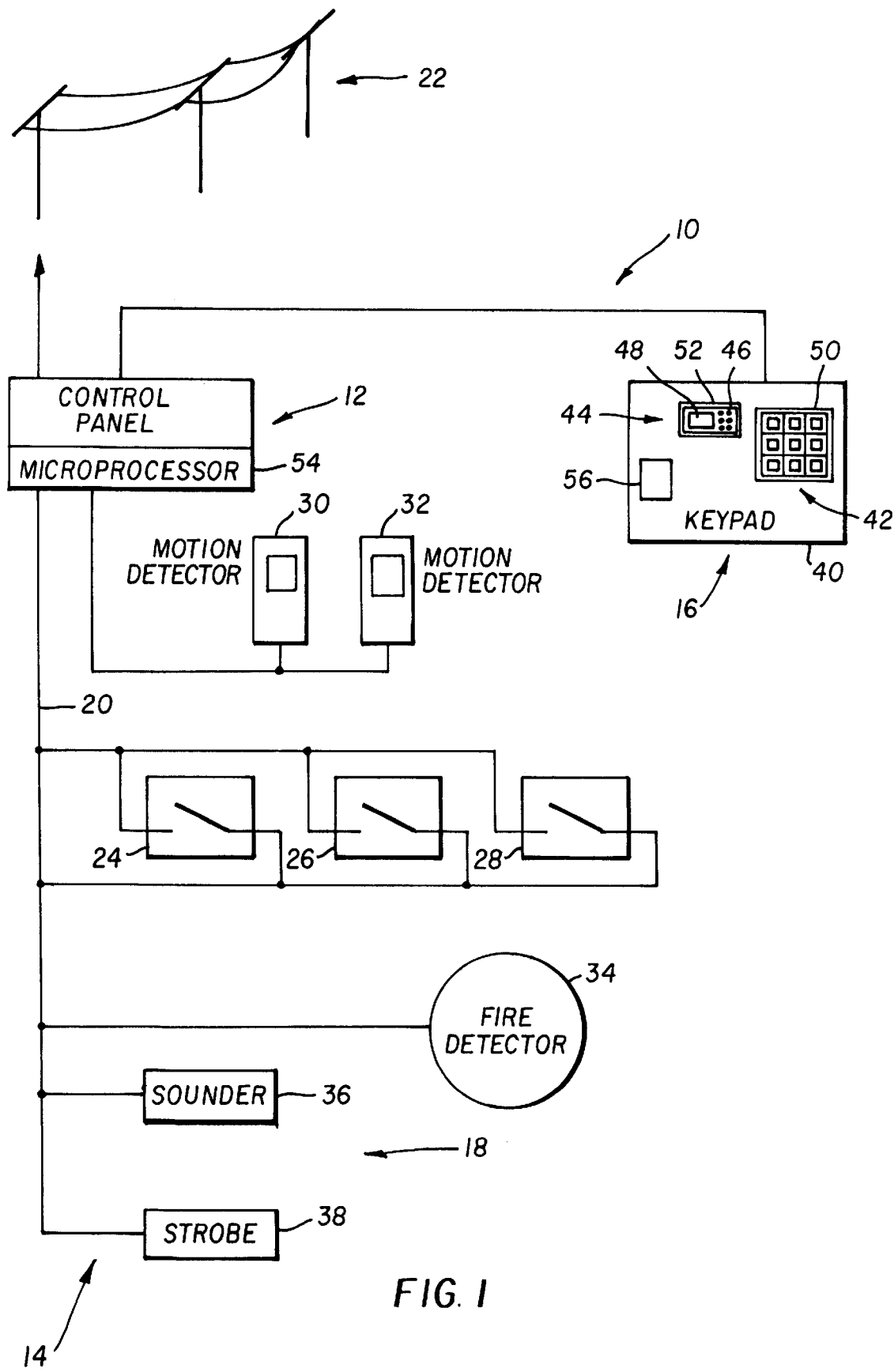
FIG. 1 is a block diagram of a security system in accordance with a preferred embodiment of the invention.

Referring now to FIG. 1, a preferred security system 10 is depicted comprising a control panel 12, a plurality of event detectors 14, interface devices 16 and alarm signaling devices 18, all electrically coupled by conductors 20. Although hard wired connections are depicted in the preferred embodiment, other communications links, such as wireless radio frequency or infrared transmitters and receivers, are examples clearly within the scope of the invention. The control panel also is linked to a public switched telephone network (PSTN) 22, again by hard wired or wireless devices, either analog or digital. Private data networks, internet and intranet links, ISDN and T1 lines, frame relays and other appropriate communications approaches, singly or in combination, are examples of other communications approaches that might be employed.

Event detectors 14 include a plurality of technologies for detecting security related events, such as the unauthorized operation of doors and windows, the breaking of glass and phenomena, such as smoke, associated with fire. Contacts 24, 26 and 28 are positioned on doors, windows and other entrance points to sense their unauthorized operation or the vibration from their violation. Motion detectors 30 and 32 are depicted as passive infrared devices that sense radiation in wavelengths corresponding to heat emitted by humans. When an intruder moves across the field of view of such a detector, it senses the temperature change, relative to the background, compares the signal to certain predetermined criteria and, when there is a match, sends an alarm signal to the control panel 12. Fire detector 34 senses the diffusion of light from smoke and other atmospheric particles typically associated with a fire. Other examples of security event detectors within the scope of the invention include active motion detectors, such as microwave detectors, fire detectors based on temperature or ionization, panic buttons and other detectors of events associated with the security of a structure or its occupants.

The event detectors are arranged in loops or zones protecting independent areas of the protected structure. Each zone is coupled to the control panel in a manner that permits its unique identification and control. Fire detectors might be arranged in one zone, for example, so an alarm from that zone easily is identified as a fire alarm. Perimeter detectors might be arranged in a different zone from interior motion detectors. This facilitates limited perimeter arming, which might be appropriate for an occupied house at night, compared to full house arming when all of the occupants leave for the day.

Signaling devices 18 include sounders 36, strobes 38 and other appropriate signaling devices for warning of an alarm condition.

Interface devices 16 are communications pads, sometimes called keypads 40, for data input and display. Permission to access and control the system is provided by a personal identification number (PIN) entered at the keypad. Once access is granted, the status of the system can be controlled from the keypad to disarm, partially arm or fully arm the system. System status also is displayed at the keypad. Data input and system control are provided by input elements such as alpha-numeric keys 42, similar to a telephone keypad. System status and other output information is provided by output elements such as status indicators 44, preferably light emitting diodes (LEDs) 46 and liquid crystal displays (LCDs) 48. For night time operation these features pertinent to the operation of the system are illuminated by back-lighting 50, which illuminates the peripheral edges of keys 42, and 52, which illuminates the background behind the characters produced by LCD 48.

The control panel 12 communicates with the system components 14, 16 and 18 and the telephone network 22. A programmable microcontroller 54 controls the overall system including its communications with the telephone network 22. When an alarm is reported from one or more of the components, the microprocessor 54 activates sounders 36 and strobes 38 and calls a commercial monitoring service over the telephone network 22.

Figure 2:
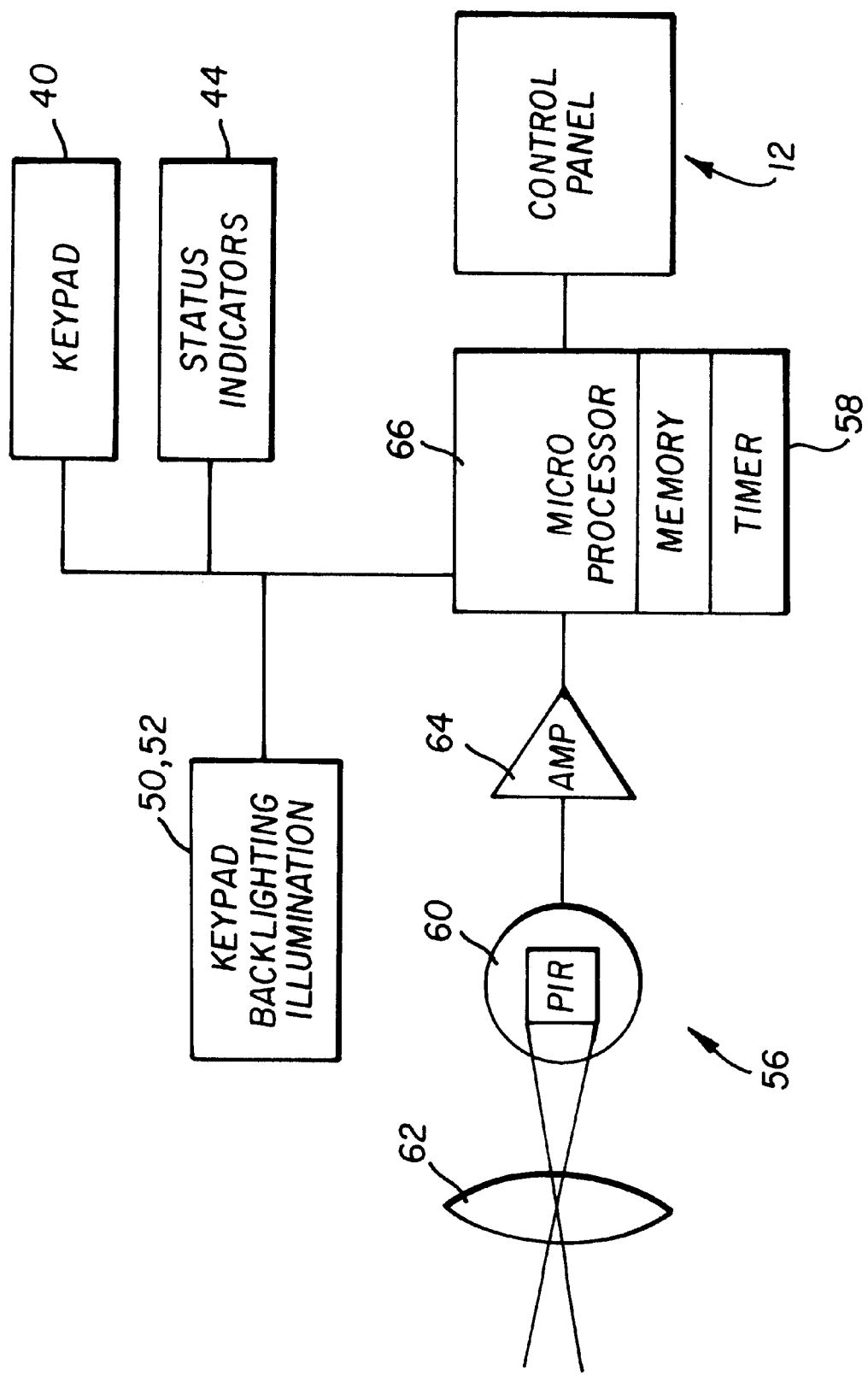
FIG. 2 is a block diagram of a security interface device, such as a keypad, in accordance with the preferred security system of FIG. 1.

Referring now more specifically to the features of the present invention, and to FIG. 2, one or more of the keypads 40 are provided with a proximity detector 56 and timer 58 for controlling self-illumination of the keypad 40. As described more fully below, the proximity detector 56 increases, enhances or turns-on the keypad self-illumination in response to the approach of a human in the vicinity of the keypad. Then, after a predetermined time interval, the timer reduces or turns off the self-illumination. The timer also is reset with each new detection by the proximity detector, continuing the self-illumination as long as presence is detected.

The detector 56 preferably is an inexpensive device that fits unobtrusively within the keypad housing or otherwise is supported by the housing. The illustrated detector is a passive infrared detector, somewhat like the motion detectors 30 and 32, but simplified in design and having significantly reduced range. A pyroelectric sensor 60 is depicted on FIG. 2, between simple optics 62 and amplifier 64, providing a signal to microprocessor 66 whenever motion is detected in the vicinity of the keypad 40. According to the preferred embodiment, detector 56 has a sensitivity selected to detect motion within a range from the keypad 40 not greater than five feet. Although greater ranges might be acceptable, the invention has particular utility, and provides additional advantages, with the preferred range or other relatively short ranges, such as maximum detection distances from the keypad of three feet up to approximately seven feet. Short detection ranges dramatically reduce problems from more distant sources, such as fans, windows, radiators and the like. A preferred range pattern is hemispherical, at least in the horizontal plane.

The optics 62 also are focused several feet above the floor and below the ceiling, preferably by more than two or three feet. Raising the effective detection range above the floor reduces activation by floor based pets, such as dogs and cats. Lowering the effective detection range below the ceiling reduces activation by ceiling mounted fans and lights.

Other examples of proximity detectors within the scope of the invention include active infrared detectors, microwave detectors, ranging devices, such as those employed in photographic and video cameras, boundary detectors, capacitance sensors and other devices suitable for detecting human presence either within or crossing into a predetermined field of interest. Although most such detectors rely on motion, or the approach of a human into the field of interest, other presence detectors are intended to be included.

Preferred detectors have very small apertures and low gain, permitting unobtrusive designs and inexpensive components.

Timer 58 is a function provided by the microprocessor 66. The microprocessor counts from the last detection of proximity detector 56 and, after a predetermined interval, reduces or completely turns off the keypad self-illumination. Each new proximity detection resets the timer and restarts the count. Given the resetting function, relatively short intervals are suitable, ranging from a few seconds to several minutes. Although longer intervals may not be a problem in a typical bedroom setting, battery operated devices often dictate shorter intervals.

In the preferred embodiment, self-illumination of the keypad is provided by back-lighting, as mentioned above, and is either on or off. Other lighting approaches include face lighting or any of the many illumination approaches suitable for identifying the input and output features of the pad. Similarly, instead of turning the source completely off, it might be maintained at low intensity to facilitate location of the pad and then increased or enhanced when approached.

It should now be apparent that a security system according to the invention includes a presence or proximity detector that activates or enhances the illumination of an interface device, such as a keypad, in response to a human approaching the interface device. The sensitivity of the detector is selected for a relatively short range, preferably elevated from the floor and below the ceiling, to reduce false triggering from more distant events. Movement beyond, under or above the predetermined range, even by humans or pets, will not trigger the detector. Similarly, fans, heaters, lights and more distant sources will be out of range and will not trigger the detector.

According to particularly advantageous features of the invention, the interface device is a keypad and includes a timing device for switching the illumination source off, or reducing the illumination, after the expiration of a predetermined time period. The proximity detector then switches the illumination source on in response to the detection of movement in the vicinity of the pad, and resets the timing device.

In accordance with the invention, illumination of a security interface device can be reduced or eliminated until required by an approaching operator, facilitating bedroom operation, improving security and reducing unnecessary current draw by battery operated devices.

While the invention is described in connection with a preferred embodiment, other modifications and applications will occur to those skilled in the art. The claims should be interpreted to fairly cover all such modifications and applications within the true spirit and scope of the invention.

PARTS LIST

| Reference No. | Part |
| --- | --- |
| 10. | Security system. |
| 12. | Control panel. |
| 14. | Event detectors. |
| 16. | Interface devices. |
| 18. | Signaling devices. |
| 20. | Conductors. |
| 22. | Public switched telephone network (PSTN). |
| 24, 26, 28. | Contact detectors. |
| 30, 32. | Motion detectors. |
| 34. | Fire detector. |
| 36. | Sounder. |
| 38. | Strobe. |
| 40. | Keypad(s). |
| 42. | Alpha-numeric keys. |
| 44. | Status indications. |
| 46. | LEDs. |
| 48. | LCDs. |
| 50, 52. | Back-lighting. |
| 54. | Microcontroller. |
| 56. | Proximity detector. |
| 58. | Timer. |
| 60. | Pyroelectric sensor. |
| 62. | Optics. |
| 64. | Amplifier. |
| 66. | Microprocessor. |

What is claimed is:

1. A keypad for controlling a security system that issues alarm signals indicating predetermined detected events, the keypad including a light source operative to illuminate the keypad; characterized in that:
   said keypad includes a proximity detector sensing a human approach to said keypad, and said proximity detector operates said light source independent of the alarm signals to increase illumination of said keypad in response to said human approach.

2. The keypad of claim 1, wherein said proximity detector operates said light source in response to said human approach not greater than seven feet from said keypad.

3. The keypad of claim 1, wherein said proximity detector detects a human approach within a distance not greater than three feet from said keypad and operates said light source in response to said approach within said three feet.

4. The keypad of claim 1, wherein said keypad includes features pertinent to the operating of the security system and said illumination source lights the background of said features.

5. The keypad of claim 4, wherein said features include characters defined by a liquid crystal display.

6. A communication pad for use with a security system that detects security threatening events, the pad including an illumination source for illuminating at least one section of the pad independent of said threatening event detection; characterized in that:
   a timing device coupled to said communication pad detects the expiration of a predetermined time period and, in response to said expiration, switches said illumination source to a reduced-illuminating state; and,
   a proximity detector coupled to said communication pad detects human presence in the vicinity of said pad and, in response to said detection, switches said illumination source to an increased illuminating state.

7. The communication pad of claim 6, wherein said proximity detector switches said illumination source to said increased illuminating state in response to said presence not greater than seven feet from said communication pad.

8. The communication pad of claim 6, wherein said proximity detector detects said presence within a distance not greater than three feet from said communication pad and switches said illumination source to said increased illumination state in response to said presence detected within said three feet.

9. The communication pad of claim 6, wherein said communication pad includes display features displaying information pertinent to the security system and said illumination source illuminates the background of said features.

10. The communication pad of claim 9, wherein said display features include characters defined by a liquid crystal display.

11. A security system comprising:
   a control panel;
   a plurality of event detectors coupled to said panel, said detectors communicating an alarm signal to said panel in response to movement in a protected region;
   a keypad coupled to said control panel, said keypad including input elements for controlling said system and display elements indicating the status of said system, said keypad further including an illumination source having an off state and an on state, said illuminating source in said on state illuminating at least a respective one of said input elements and said display elements; and,
   a proximity detector coupled to said keypad, said proximity detector detecting movement in the vicinity of said keypad and, in response to said detection, switching said illumination source to said on state independent of said alarm signal.

12. The security system of claim 11, further including a timing device coupled to said keypad, said timing device detecting the expiration of a predetermined time period and switching said illumination source to said off state in response to said expiration.

13. The security system of claim 11, wherein said proximity detector switches said illumination source to said on state in response to said movement not greater than seven feet from said keypad.

14. The security system of claim 11, wherein said proximity detector detects movement within a distance less than three feet from said keypad and switches said illumination source to said on state in response to said movement detected within said three feet.

15. The security system of claim 11, wherein said illumination source provides background illumination for at least a respective one of said input elements and said display elements in said on state.

16. A security system comprising:

a control panel;

a plurality of event detectors coupled to said panel, said detectors communicating alarm signals to said panel in response to movement in a protected region;

a keypad coupled to said control panel, said keypad including input elements for controlling said system and display elements indicating the status of said system, said keypad further including an illumination source operative to increase illumination of at least a respective one of said input elements and said display elements; and, a passive motion sensor supported by said keypad, said motion sensor detecting movement within a range not greater than five feet from said keypad, said motion sensor operating said illumination source, in response to said detected movement and independent of any said alarm signal, to increase said illumination.

17. The security system of claim 16, further including a timeout device operating said illumination source to discontinue said increase a predetermined time interval after said detected movement.

18. The security system of claim 17, wherein said keypad is mounted in a room having a floor, and said range of detection does not extend to said floor.

19. The security system of claim 18, wherein said keypad is mounted in a room having a ceiling and floor, and said range of detection does not extend to said ceiling or said floor.

* * * * *